United States Patent
Grobman

(10) Patent No.: US 8,191,062 B2
(45) Date of Patent: May 29, 2012

(54) SYSTEM FOR PROCESSOR FREQUENCY GOVERNORS TO GOVERN A PROCESSOR FREQUENCY BY DERIVING CPU UTILIZATION INFORMATION BASED ON THE STATE OF VIRTUAL MACHINE MONITOR

(75) Inventor: Steven Grobman, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 1402 days.

(21) Appl. No.: 11/395,050

(22) Filed: Mar. 31, 2006

(65) Prior Publication Data
US 2007/0234357 A1    Oct. 4, 2007

(51) Int. Cl.
- G06F 9/455 (2006.01)
- G06F 9/46 (2006.01)
- G06F 1/00 (2006.01)
- G06F 1/26 (2006.01)

(52) U.S. Cl. ............ 718/1; 718/104; 713/300; 713/320
(58) Field of Classification Search .......................... None
See application file for complete search history.

(56) References Cited

U.S. PATENT DOCUMENTS

| | | | |
|---|---|---|---|
| 7,386,739 B2 * | 6/2008 | Ghiasi et al. ................... 713/300 |
| 7,401,240 B2 * | 7/2008 | Heller et al. .................... 713/320 |
| 2004/0128670 A1 * | 7/2004 | Robinson et al. ................. 718/1 |
| 2004/0268347 A1 * | 12/2004 | Knauerhase et al. .............. 718/1 |
| 2005/0060702 A1 * | 3/2005 | Bennett et al. ...................... 718/1 |
| 2005/0240828 A1 * | 10/2005 | Rothman et al. ................. 714/43 |
| 2005/0273636 A1 | 12/2005 | Grobman |
| 2005/0289648 A1 | 12/2005 | Grobman et al. |
| 2006/0200819 A1 * | 9/2006 | Cherkasova et al. .............. 718/1 |
| 2006/0200821 A1 * | 9/2006 | Cherkasova et al. .............. 718/1 |
| 2007/0028244 A1 * | 2/2007 | Landis et al. ................... 718/108 |
| 2007/0050764 A1 * | 3/2007 | Traut ................................. 718/1 |
| 2007/0234357 A1 | 10/2007 | Grobman |
| 2011/0088030 A1 * | 4/2011 | Agesen et al. ..................... 718/1 |

* cited by examiner

*Primary Examiner* — Meng An
*Assistant Examiner* — Tammy Lee
(74) *Attorney, Agent, or Firm* — Trop, Pruner & Hu, P.C.

(57) ABSTRACT

A method, apparatus and system enable processor frequency governors to comprehend virtualized platforms. Specifically, in one embodiment, the processor frequency governor in a virtual host may be para-virtualized. As a result, the processor frequency governor may run in a partition on the virtualized platform and nonetheless collect and process central processing utility ("CPU") information on the virtualized platform based on the activity of a plurality of virtual machines on the virtual host.

14 Claims, 4 Drawing Sheets

SYSTEM FOR PROCESSOR FREQUENCY GOVERNORS TO GOVERN A PROCESSOR FREQUENCY BY DERIVING CPU UTILIZATION INFORMATION BASED ON THE STATE OF VIRTUAL MACHINE MONITOR

BACKGROUND

Automatic processor frequency governors are software components within an operating system ("OS") that optimize a platform's power/performance by automatically scaling the processor ("CPU") frequency based on CPU load. Typically, the governor analyzes processor utilization at regular intervals, such as 250 ms, dropping the frequency in response to high-idle periods, and raising it in response to high-utilization periods. CPU utilization is typically calculated by detecting if the CPU is halted when a periodic timer interrupt on the platform is fired. Thus, for example, if the timer interrupt fires 1000 times per second and in the last 1/10 of a second, the CPU was halted 40 of 100 times when the timer interrupt fired, the OS may calculate a CPU "load" of 60%.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention provide a method, apparatus and system for processor frequency governors to comprehend virtualized platforms. Reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

Figure 1A:
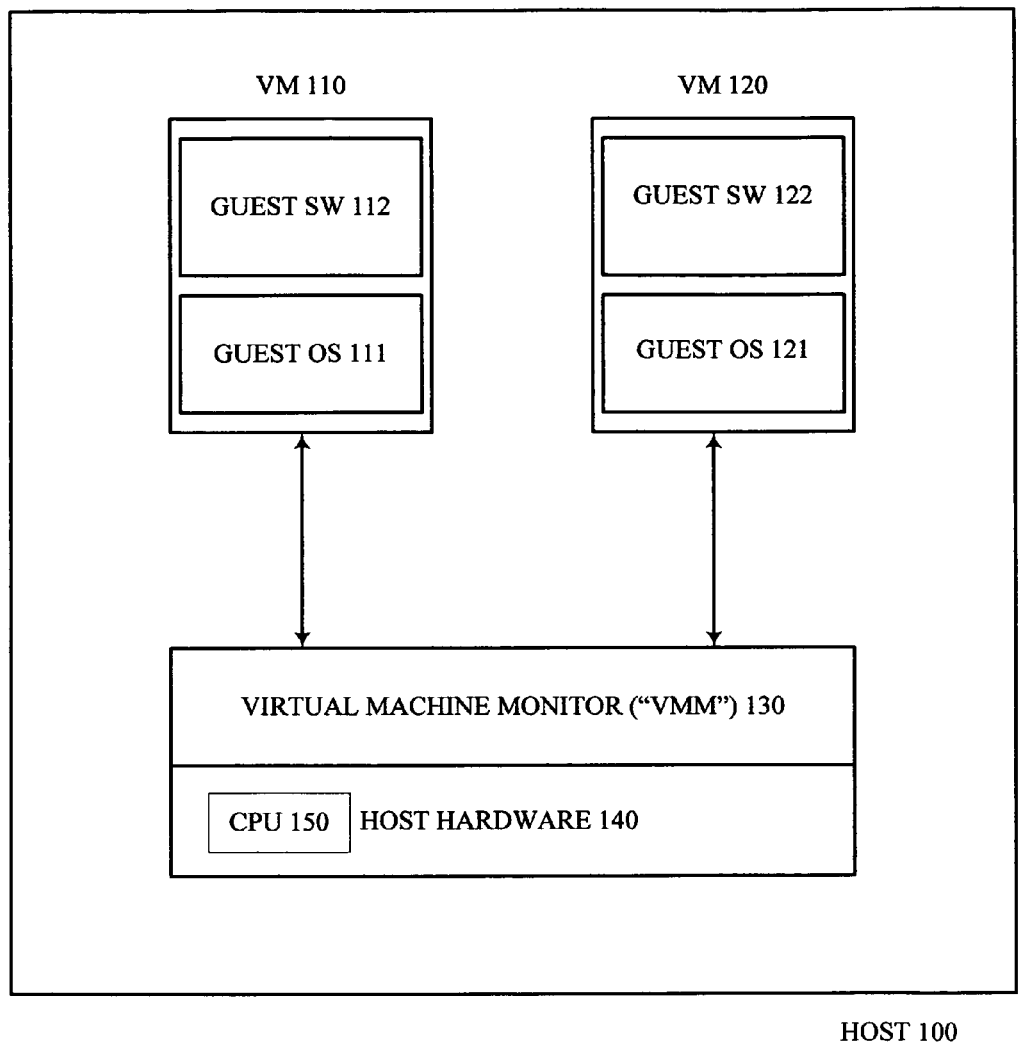
FIG. 1A illustrates an example of a typical virtual machine platform.

In order to facilitate understanding of embodiments of the invention, the following is a general description of a virtualized platform. FIG. 1A illustrates an example of a typical virtual machine host platform ("Host 100") having a virtual-machine monitor ("VMM 130") that presents an abstraction(s) and/or view(s) of the platform (also referred to as "virtual machines" or "VMs") to other software. Although only two VM partitions are illustrated ("VM 110" and "VM 120", hereafter referred to collectively as "VMs"), these VMs are merely illustrative and additional virtual machines may be added to the host. VMM 130 may be implemented in software (e.g., as a standalone program and/or a component of a host operating system), hardware, firmware and/or any combination thereof.

VM 110 and VM 120 may function as self-contained platforms respectively, running their own "guest operating systems" (i.e., operating systems hosted by VMM 130, illustrated as "Guest OS 111" and "Guest OS 121" and hereafter referred to collectively as "Guest OS") and other software (illustrated as "Guest Software 112" and "Guest Software 122" and hereafter referred to collectively as "Guest Software"). Each Guest OS and/or Guest Software may operate as if it were running on a dedicated computer. That is, each Guest OS and/or Guest Software may expect to control various events and have access to hardware resources on Host 100. Within each VM, the Guest OS and/or Guest Software may behave as if they were, in effect, running on Host 100's physical hardware ("Host Hardware 140", including "CPU 150"). VMM 130 may be "hosted" (i.e., a VMM that is started from and under the control of a host operating system) or unhosted (e.g., a "hypervisor"). In either scenario, each Guest OS in the VMs believes that it fully "owns" Host 100's hardware.

In a typical hypervisor VMM scenario currently, power management may not be comprehended at all on the platform. In certain emerging implementations of hypervisor VMMs (e.g., a "thin VMM" implementation), on the other hand, the VMM may map the vast majority of hardware on the platform to a single VM. In this thin VMM scenario, there are advantages to running the power management subsystem (including the frequency governor) in this VM. Since the platform hardware is mapped to this VM, it may have the greatest control over managing those resources. Thin VMM implementations may be used, for example, on virtualized platforms that include a dedicated "service" partition that handles platform management tasks such as intrusion detection, as well as monitoring and managing the power policy for the host, while the user may continue tasks uninterrupted in a "capability" partition. In these environments, the thin VMM may map all or the majority of hardware on the host directly to the capability partition.

There are, however, disadvantages to this thin VMM type scenario because the frequency governor in the capability VM may only "see" the activities within that VM. In other words, since the frequency governor is typically monitored by the OS on the host, in this virtualized scenario, the OS in the capability partition (i.e., the OS observing the CPU state when the timer interrupt fires) may monitor the frequency governor, which in turn is monitoring the CPU utilization. In this scenario, the frequency governor may make decisions regarding CPU utilization based solely on the information from the capability partition, regardless of the activities in the service partition. As a result, the frequency monitor may erroneously lower and/or fail to raise the CPU frequency on the host.

Figure 1B:
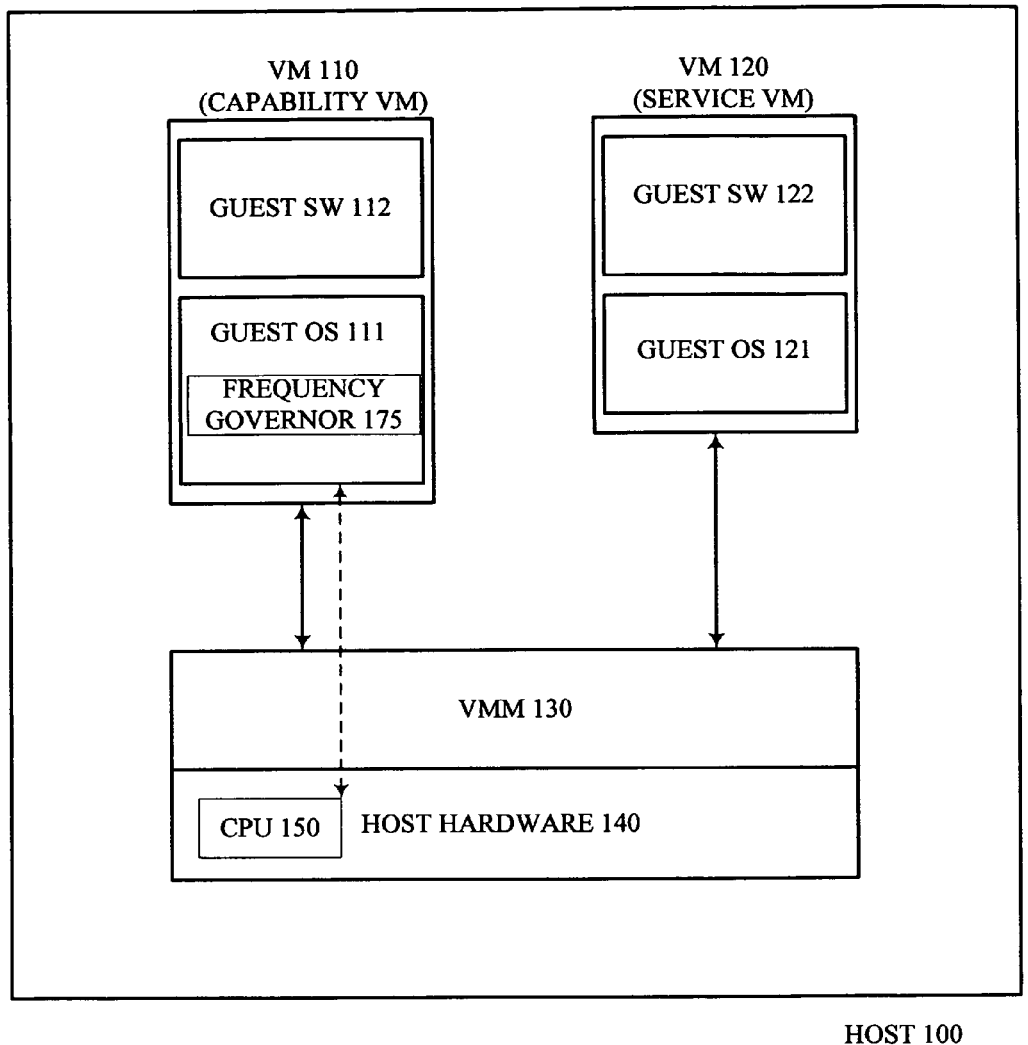
FIG. 1B illustrates an example of a typical virtual machine platform having a thin VMM and dedicated partitions.

By way of example, as illustrated in FIG. 1B, if VM 110 is a capability partition while VM 120 acts as a service partition, Frequency Governor 175 in Guest OS 111 may be responsible for calculating CPU 150 utilization for Host 100, despite the fact that VM 110 is not the only partition on Host 100 that utilizes CPU resources. Given the isolation of the partitions, each partition is typically unaware of other partitions on the virtualized platform. Thus, in this scenario, regardless of whether VM 120 is utilizing significant CPU resources (e.g., performing continuous intrusion detection), if VM 110 is relatively idle, Frequency Governor 175 in VM 110 may determine that Host 100's CPU utilization is low, and as a result, lower Host 100's CPU frequency. In reality, given the activity in VM 120, the desired behavior may be to maintain or raise the frequency.

According to an embodiment of the present invention, the frequency governor on Host 100 may be enhanced to comprehend the virtualized platform, i.e., to comprehend physical CPU utilization spanning all partitions on the platform, thus enabling the frequency governor to optimize CPU utilization more accurately than it is currently able to. Thus, according to an embodiment of the invention, the enhanced frequency governor may be "para-virtualized". The term "para-virtualized" is well known to those of ordinary skill in the art and includes platform components that are aware that they are running in a virtualized environment and that are capable of utilizing features of the virtualized environment to optimize performance and/or simplify implementation of a virtualized environment. Thus, in one embodiment, the enhanced frequency governor may be aware that it is running in a virtualized environment and utilize this awareness to enhance its performance.

Figure 2:
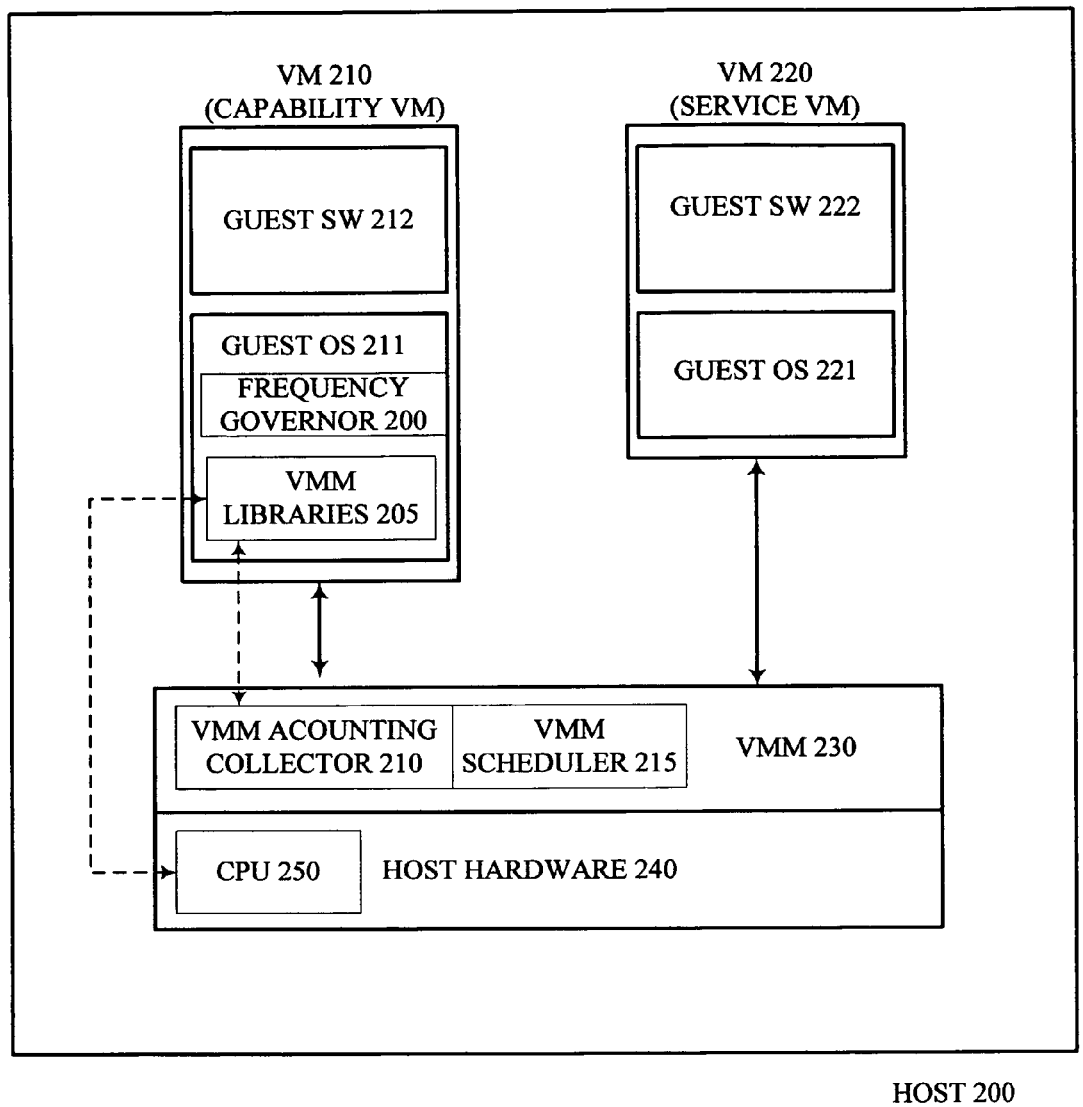
FIG. 2 illustrates an embodiment of the present invention.

Thus, according to one embodiment as illustrated in FIG. 2, the enhanced frequency governor ("Frequency Governor 200") may include a set of libraries ("VMM Libraries 205") that enable the governor to interact with VMM 230 via an "accounting collector" ("VMM Accounting Collector 210") in VMM 230. In contrast with a non-para-virtualized frequency governor that would typically monitor only OS 111, according to embodiments of the present invention, since Frequency Governor 200 is aware that it is running on an operating system managed by VMM 230, Frequency Governor 200 may, via VMM Libraries 205 and VMM Accounting Collector 210, interact with VMM 230 to determine actual CPU utilization on Host 200. More specifically, VMM Accounting Collector 210 may interact with the scheduler ("VMM Scheduler 215") within VMM 230 to collect information pertaining to CPU utilization across the various VMs on Host 200 and this information may be provided to Frequency Governor 200 (via VMM Libraries 205) with the requisite information for Frequency Governor 200 to determine accurate CPU utilization.

Thus, for example, in one embodiment, Frequency Governor 200 may receive information from VMM 230 based on the actual activity within the various VMs on Host 200. The CPU utilization calculated based on this information may provide Frequency Governor 200 with a more accurate picture of Host 200's CPU utilization than otherwise. This embodiment does, however, incur a performance cost since VMM 230 has to continuously collect timer interrupt information from the various VMs and the Frequency Governor 200 has to continuously interact with VMM 230 in order to obtain information about CPU usage by various VMs.

In an alternate embodiment, in order to improve performance, VMM 230 may avoid continuously intercepting timer interrupts from various VMs. Instead, at specific intervals, Frequency Governor 200 may monitor the state of VMM 230. If none of the VMs on Host 200 are active, VMM 230 may be in a sleep state and conversely, if at least one VM is active, VMM 230 may show as being active. Thus, in this scenario, if Host 200's timer interrupt fires 1000 times per second, Frequency Governor 200 may obtain information in each of these time interrupts as to the state of VMM 230. Frequency Governor 200 may calculate CPU utilization based on this information, under the assumption that the state of VMM 230 is an accurate indicator of the state of the CPU (active vs. not active). Although possibly less accurate than other embodiments, this embodiment nonetheless enjoys the benefit of good accuracy coupled with better performance because VMM 230 may not have to monitor the activities in each VM on Host 200 in order for Frequency Governor 200 to calculate CPU utilization.

Figure 3:
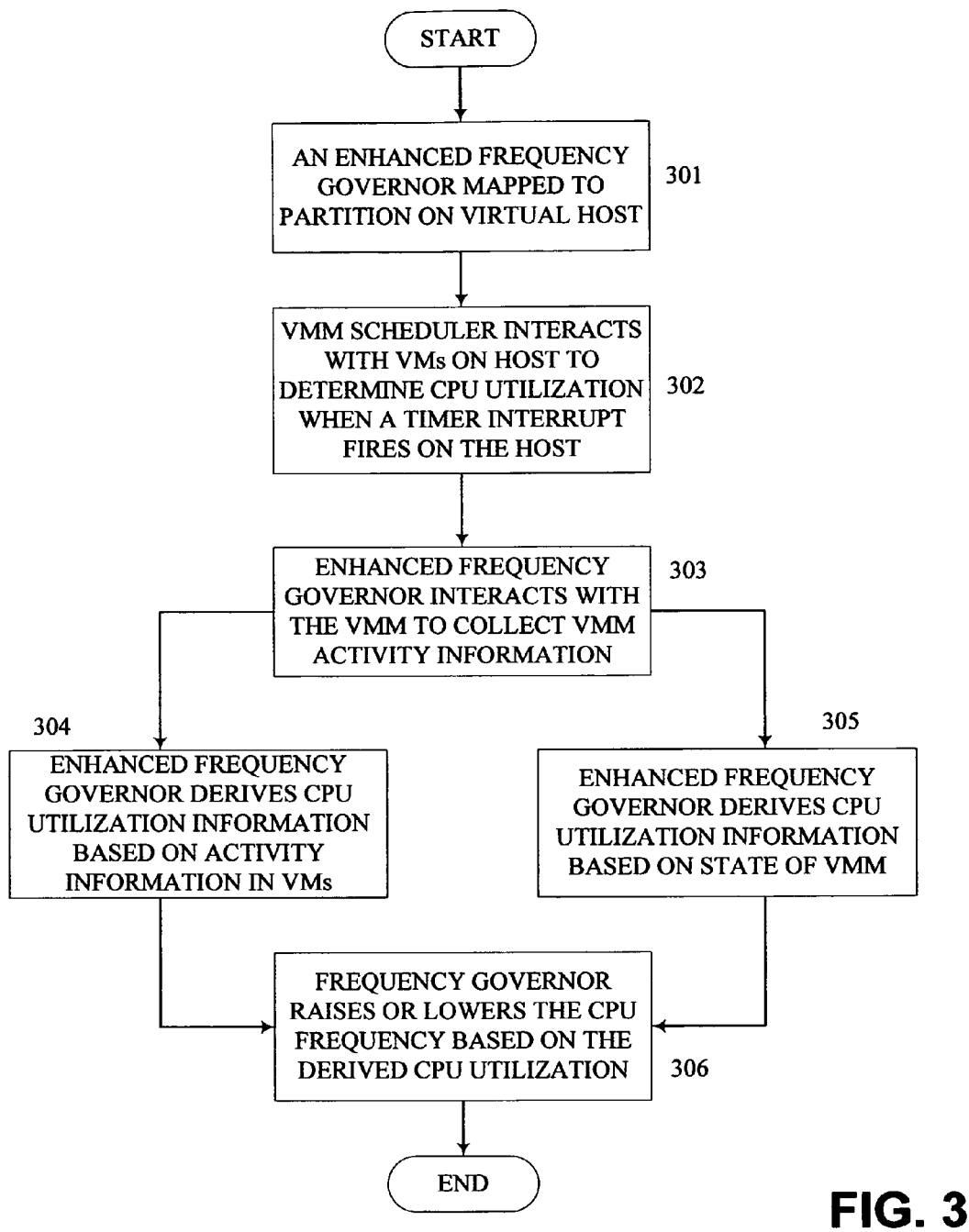
FIG. 3 is a flow chart illustrating an embodiment of the present invention.

FIG. 3 is a flow chart illustrating an embodiment of the present invention. Although the following operations may be described as a sequential process, many of the operations may in fact be performed in parallel and/or concurrently. In addition, the order of the operations may be re-arranged without departing from the spirit of embodiments of the invention. In 301, an enhanced frequency governor may be mapped to a partition on a virtual host while in 302, a VMM scheduler may interact with the VMM on the virtual host to collect activity information from all the partitions on the host when a timer interrupt fires on the host. In 303, the enhanced frequency governor may interact with a VMM accounting collector in the VMM via VMM libraries. In one embodiment, the VMM accounting collector may obtain information from the VMM scheduler, to derive CPU utilization information. In one embodiment, in 304, the CPU utilization information may be derived from the activity information collected from all the partitions on the host. In an alternate embodiment, in 305, the CPU utilization information may be derived from the state of the VMM itself. In 306, the frequency governor may utilize the CPU frequency information to perform platform governance (i.e., raise or lower the CPU frequency as appropriate, based on the data).

Embodiments of the present invention may be implemented on a variety of computing devices. According to an embodiment, a computing device may include various other well-known components such as one or more processors. The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. One or more of these elements may be integrated together with the processor on a single package or using multiple packages or dies. A host bus controller such as a Universal Serial Bus ("USB") host controller may be coupled to the bus(es) and a plurality of devices may be coupled to the USB. For example, user input devices such as a keyboard and mouse may be included in the computing device for providing input data. In alternate embodiments, the host bus controller may be compatible with various other interconnect standards including PCI, PCI Express, FireWire and other such existing and future standards.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   obtaining state information, in a frequency governor of a first virtual machine ("VM") of a host including a plurality of VMs, from a virtual machine manager ("VMM") on the host, wherein the state information indicates a state of the VMM, the state information being an active state if at least one of the plurality of VMs is active and a sleep state if none of the plurality of VMs are active;
   deriving, in the frequency governor, utilization of a central processing unit ("CPU") of the host that is utilized by the plurality of VMs based on the state information, wherein the VMM state is an indicator of a state of the CPU and the VMM does not intercept timer interrupts from the plurality of VMs, and the frequency governor is to derive the utilization without monitoring activity of each of the plurality of VMs on the host; and governing a frequency of the CPU, via the frequency governor, based on the utilization.

2. The method according to claim 1 wherein obtaining state information from the VMM further comprises interacting with a scheduler in the VMM.

3. The method according to claim 1 wherein the VMM is a thin VMM.

4. The method according to claim 1 further comprising raising the CPU frequency if the derived utilization of the CPU is high and lowering the CPU frequency if the derived utilization of the CPU is low.

5. A system, comprising:
a central processing unit ("CPU");
a virtual machine monitor ("VMM") coupled to the CPU and including a VMM scheduler to collect information pertaining to CPU utilization from each of a plurality of virtual machines ("VMs") and a VMM accounting module to report the collected information;
the plurality of VMs coupled to the VMM, the VMM to collect activity information from the plurality of VMs, the activity information to indicate whether the VM is active, inactive or in a sleep state; and
a frequency governor residing in one of the plurality of virtual machines, the frequency governor to interact with the VMM to determine CPU utilization across the plurality of VMs based on a state of the VMM, the state of the VMM being an active state if at least one of the plurality of VMs is active and a sleep state if none of the plurality of VMs are active, the frequency governor further to manage CPU frequency based on the determined CPU utilization, the frequency governor including a set of libraries to enable the frequency governor to interact with the VMM accounting module to receive the collected information and to determine the determined CPU utilization based thereon.

6. The system according to claim 5 wherein the frequency governor is to determine the determined CPU utilization based on the activity information collected by the VMM from the plurality of VMs.

7. The system according to claim 5 wherein the frequency governor is further to manage CPU frequency by lowering the CPU frequency if the determined CPU utilization is low and raising the CPU frequency if the determined CPU utilization is high.

8. The system according to claim 5 wherein the frequency governor is para-virtualized.

9. The system of claim 5 wherein the VMM is to collect timer interrupt information from the plurality of VMs and the frequency governor is to interact with the VMM to obtain the collected information.

10. The system of claim 5 wherein the frequency governor is aware of a virtualized environment of the system.

11. The system of claim 5 wherein the frequency governor resides in a capability VM and a second VM corresponds to a service VM.

12. An article comprising a non-transitory machine-accessible medium having stored thereon instructions that, when executed by a machine, cause the machine to:
obtain state information, in a frequency governor of a first virtual machine ("VM") of a host including a plurality of VMs, from a virtual machine monitor ("VMM") on the host, wherein the state information indicates a state of the VMM, the state information being an active state if at least one of the plurality of VMs is active and a sleep state if none of the plurality of VMs is active;
derive utilization of a central processing unit ("CPU") of the host that is utilized by the plurality of VMs based on the state information, wherein the VMM state is an indicator of a state of the CPU and the VMM does not intercept timer interrupts from the plurality of VMs, and the frequency governor is to derive the utilization without monitoring activity of each of the plurality of VMs on the host; and
govern a frequency of the CPU based on the utilization.

13. The article according to claim 12 wherein the instructions, when executed by the machine further cause the machine to obtain the state information from the VMM by determining whether the VMM is one of active and asleep when a timer interrupt fires on the host.

14. The article according to claim 12 wherein the instructions, when executed by the machine, further cause the machine to raise the CPU frequency if the derived utilization of the CPU is high and lower the CPU frequency if the derived utilization of the CPU is low.

* * * * *